United States Patent
Chang et al.

(10) Patent No.: US 12,477,469 B2
(45) Date of Patent: Nov. 18, 2025

(54) POWER OPTIMIZATION METHOD FOR UPLINK TRANSMISSION AND USER EQUIPMENT AND COMPUTER-READABLE MEDIUM THEREOF

(71) Applicant: MEDIATEK INC., Hsinchu (TW)

(72) Inventors: Chiao-Chih Chang, Hsinchu (TW); I-Wei Tsai, Hsinchu (TW); Jun-Jie Su, Hsinchu (TW); Ho-Wen Pu, Hsinchu (TW); En-Jung Farn, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 771 days.

(21) Appl. No.: 17/836,642

(22) Filed: Jun. 9, 2022

(65) Prior Publication Data
US 2022/0408365 A1    Dec. 22, 2022

Related U.S. Application Data

(60) Provisional application No. 63/233,832, filed on Aug. 17, 2021, provisional application No. 63/211,034, filed on Jun. 16, 2021.

(51) Int. Cl.
*H04W 52/02* (2009.01)
*H04W 72/1268* (2023.01)

(52) U.S. Cl.
CPC ... *H04W 52/0251* (2013.01); *H04W 72/1268* (2013.01)

(58) Field of Classification Search
CPC ............... H04W 52/0251; H04W 72/1268

USPC ........................................................ 370/311
See application file for complete search history.

(56) References Cited

U.S. PATENT DOCUMENTS 10,657,242 B1 * 5/2020 Xia .................... H04L 9/0825
2019/0166520 A1 * 5/2019 Luna .................. H04L 67/145

FOREIGN PATENT DOCUMENTS

WO        2014/179508 A1    11/2014

OTHER PUBLICATIONS

Chinese language office action dated Aug. 17, 2022, issued in application No. TW 111122417.

* cited by examiner

*Primary Examiner* — Chuck Huynh
(74) *Attorney, Agent, or Firm* — McClure, Qualey & Rodack, LLP

(57) ABSTRACT

A power optimization method for uplink data transmission is provided. The power optimization method is applied to user equipment (UE). The power optimization method includes the following steps. The UE determines the current application scenario of the UE. The UE determines the data transmission window corresponding to the current application scenario. Data transmission windows corresponding to different application scenarios of the UE have at least one of different period to transmit data and different period to enter suspension. The UE may transmit data based on the determined data transmission window.

11 Claims, 3 Drawing Sheets

POWER OPTIMIZATION METHOD FOR UPLINK TRANSMISSION AND USER EQUIPMENT AND COMPUTER-READABLE MEDIUM THEREOF

CROSS REFERENCE TO RELATED APPLICATIONS

This application claims priority of U.S. Provisional Patent Application No. 63/211,034, filed on Jun. 16, 2021 and U.S. Provisional Patent Application No. 63/233,832, filed on Aug. 17, 2020, the entirety of which is incorporated by reference herein.

BACKGROUND OF THE INVENTION

Field of the Invention

The invention generally relates to power optimization technology, and more particularly, to a power optimization method in which the UE may perform different uplink traffic-shaping for uplink data transmission in different application scenarios.

Description of the Related Art

GSM/GPRS/EDGE technology is also called 2G cellular technology, WCDMA/CDMA-2000/TD-SCDMA technology is also called 3G cellular technology, and LTE/LTE-A/TD-LTE technology is also called 4G cellular technology. These cellular technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In 5G NR, when the UE transmits a little data multiple times, the UE may use more power than 4G communication. Therefore, how to reduce power consumption in the uplink data transmission of 5G NR is a topic that is worthy of discussion.

BRIEF SUMMARY OF THE INVENTION

A power optimization method for uplink data transmission, user equipment (UE), and a computer-readable medium are provided to overcome the problems mentioned above.

An embodiment of the invention provides a power optimization method for uplink data transmission. The power optimization method is applied to user equipment (UE). The power optimization method includes the following steps. The UE determines the current application scenario of the UE. The UE determines the data transmission window corresponding to the current application scenario. Data transmission windows corresponding to different application scenarios of the UE have at least one of different period to transmit data and different period to enter suspension. The UE may transmit data based on the determined data transmission window.

In some embodiments, in the power optimization method, the current application scenario of the UE is a foreground activity is running, no foreground activity is running, a Screen Off mode or a Do Not Disturb mode.

In some embodiments, in the power optimization method, when the current application scenario of the UE is the foreground activity is running and no uplink packet is generated from the foreground activity, the determined data transmission window has a first period to transmit data and a first period to enter suspension. The current application scenario is determined to the foreground activity is running and no uplink packet is generated from the foreground activity responsive to no uplink packet being generated from the foreground activity for a specific period. In some embodiments, in the power optimization method, when the current application scenario of the UE is the foreground activity is running and at least one uplink packet is generated from the foreground activity, the determined data transmission window has a second period to transmit data and a second period to enter suspension, wherein the second period to enter suspension is equal or more than 0.

In some embodiments, in the power optimization method, when the current application scenario of the UE is no foreground activity is running, the determined data transmission window has a third period to transmit data and a third period to enter suspension. In these embodiments, at least one uplink packet may be generated from a background activity An embodiment of the invention provides user equipment (UE) for power optimization for uplink data transmission. The UE comprises a radio frequency (RF) signal processing device, a memory device and a processor. The RF signal processing device transmits data to a network node. The memory device stores a plurality of data transmission windows. The plurality of data transmission windows correspond to different application scenarios of the UE and have at least one of different period to transmit data and different period to enter suspension. The processor is coupled to the RF signal processing device and the memory device. The processor determines a current application scenario of the UE and determines a data transmission window corresponding to the current application scenario, and the RF signal processing device transmits the data based on the data transmission window.

An embodiment of the invention provides a computer-readable medium. The computer-readable medium stores one or more instructions and operates with user equipment (UE). In response to the instructions having been executed by the UE, the UE executes a plurality of steps comprising the following. The UE determines the current application scenario of the UE. The UE determines the data transmission window corresponding to the current application scenario. Data transmission windows corresponding to different application scenarios of the UE have at least one of different period to transmit data and different period to enter suspension. The UE may transmit data based on the determined data transmission window.

Other aspects and features of the invention will become apparent to those with ordinary skill in the art upon review of the following descriptions of specific embodiments of the power optimization method for uplink data transmission, the UE and the computer-readable medium.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
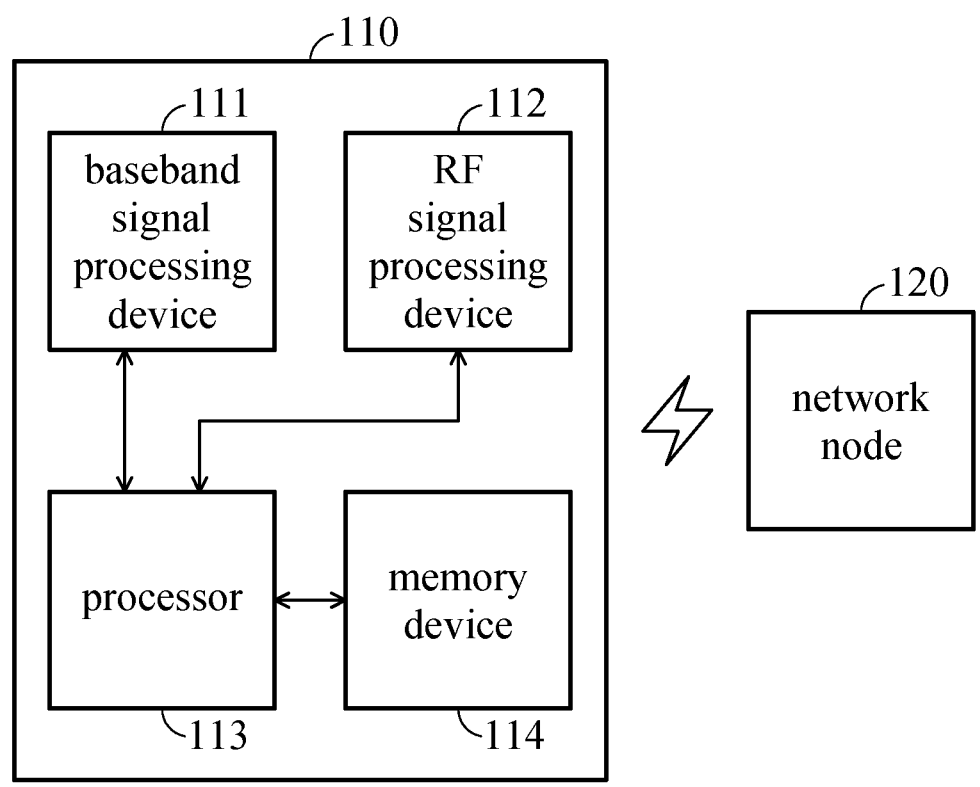
FIG. 1 is a block diagram of a wireless communications system according to an embodiment of the invention.

FIG. 1 is a block diagram of a wireless communications system according to an embodiment of the invention. As shown in FIG. 1, the wireless communications system may comprise user equipment (UE) 110 and a network node 120. It should be noted that, in order to clarify the concept of the invention, FIG. 1 presents a simplified block diagram in which only the elements relevant to the invention are shown. However, the invention should not be limited to what is shown in FIG. 1.

As shown in FIG. 1, the UE 110 may comprise at least a baseband signal processing device 111, a radio frequency (RF) signal processing device 112, a processor 113, a memory device 114, and an antenna module comprising at least one antenna. It should be noted that, in order to clarify the concept of the invention, the UE 110 of FIG. 1 presents a simplified block diagram in which only the elements relevant to the invention are shown. However, the invention should not be limited to what is shown in FIG. 1.

In the embodiments of the invention, the UE 110 may be a smartphone, a Personal Data Assistant (PDA), a pager, a laptop computer, a desktop computer, a wireless handset, or any computing device that includes a wireless communications interface.

The RF signal processing device 112 may receive RF signals via the antenna and process the received RF signals to convert the received RF signals to baseband signals to be processed by the baseband signal processing device 111, or receive baseband signals from the baseband signal processing device 111 and convert the received baseband signals to RF signals to be transmitted to a peer communications apparatus. The RF signal processing device 112 may comprise a plurality of hardware elements to perform radio frequency conversion. For example, the RF signal processing device 112 may comprise a power amplifier, a mixer, an analog-to-digital converter (ADC) and a digital-to-analog converter (DAC), etc.

The baseband signal processing device 111 may further process the baseband signals to obtain information or data transmitted by the peer communications apparatus. The baseband signal processing device 111 may also comprise a plurality of hardware elements to perform baseband signal processing.

The processor 113 may control the operations of the baseband signal processing device 111 and the RF signal processing device 112. According to an embodiment of the invention, the processor 113 may also be arranged to execute the program codes of the software modules of the corresponding baseband signal processing device 111 and/or the RF signal processing device 112. The program codes accompanied by specific data in a data structure may also be referred to as a processor logic unit or a stack instance when being executed. Therefore, the processor 113 may be regarded as being comprised of a plurality of processor logic units, each for executing one or more specific functions or tasks of the corresponding software modules.

The memory device 114 may store the software and firmware program codes, system data, user data, etc. of the UE 110. The memory device 114 may be a volatile memory such as a random access memory (RAM); a non-volatile memory such as a flash memory or a read-only memory (ROM); a hard disk; or any combination thereof.

According to an embodiment of the invention, the RF signal processing device 112 and the baseband signal processing device 111 may collectively be regarded as a radio module capable of communicating with a wireless network to provide wireless communications services in compliance with a predetermined Radio Access Technology (RAT). It should be noted that, in some embodiments of the invention, the UE 110 may be extended further to comprise more than one antenna and/or more than one radio module, and the invention should not be limited to what is shown in FIG. 1.

In the embodiments, the network node 120 may be a base station, a gNodeB (gNB), a NodeB (NB) an eNodeB (eNB), an access point, or an access terminal, but the invention should not be limited thereto. In the embodiments, the UE 110 may communicate with the network node 120 through the fifth generation (5G) communication technology or 5G New Radio (NR) communication technology, but the invention should not be limited thereto.

According to an embodiment of the invention, the processor 113 may determine the current application scenario of the UE 110. The processor 113 may determines the data transmission window corresponding to the current application scenario from the memory device 114. Then, the RF signal processing device 112 may transmits the uplink data based on the data transmission window corresponding to the current application scenario. The operations performed during the data transmission window corresponding to the current application scenario may be called as "uplink traffic-shaping" corresponding to the current application scenario in the invention. The "uplink traffic-shaping" may be performed periodically and its period may be the length of the transmission window.

According to the embodiments of the invention, the memory device 114 may store a plurality of data transmission windows in advance.

Different data transmission windows may correspond to different application scenarios of the UE 110. Each data transmission window may have at least one of a corresponding period to transmit data and a corresponding period to enter suspension (or enter suspension mode). Specifically, a data transmission window corresponding to an application scenario of the UE 110 may be used to indicate the period to transmit uplink data to the network node 120 and indicate the period to enter suspension during the data transmission window. During the data transmission window, after the period to transmit uplink data to the network node 120, the UE 110 enters suspension in the period to enter suspension. For example, if a length of a transmission window corresponding to an application scenario of the UE 110 is 15 seconds and the period to enter suspension in each transmission window corresponding to the application scenario is 14 seconds, when the UE 110 performs the uplink traffic-shaping for the application scenario based on this data transmission window, during each transmission window, the UE 110 transmits the uplink data for 1 second and then enters into suspension for 14 seconds after transmitting the uplink data.

According to another embodiment of the invention, for some application scenarios, because no uplink data needs to be transmitted, during the transmission windows corresponding to these application scenarios, the UE 110 can enter suspension directly, i.e. the period to transmit uplink data in these transmission windows is 0.

In the embodiments of the invention, the application scenario may be a foreground activity is running (e.g. watching a video stream, playing a game application, but the invention should not be limited thereto), no foreground activity is running (at least one background activity may still be running to generate uplink data in this scenario), a Screen Off mode, or a Do Not Disturb mode, but the invention should not be limited thereto. It should be noted that when a foreground activity is running, some background activities may be also running at the same time.

According to an embodiment of the invention, the processor 113 may determine whether the current application scenario of the UE 110 is that a foreground activity is running.

According to an embodiment, when the current application scenario of the UE 110 is that the foreground activity is running, the processor 113 may further determine whether at least one uplink packet from the foreground activity is generated.

In an embodiment, if the current application scenario of the UE 110 is that the foreground activity is running and the at least one uplink packet from the foreground activity is generated, the RF signal processing device 112 may transmit the uplink packets from the foreground activity based on the transmission window corresponding to the current application scenario of the UE 110. In the embodiment, the period to enter suspension in the transmission window may be 0.

In another embodiment, if the current application scenario of the UE 110 is that the foreground activity is running and no uplink packet from the foreground activity is generated, the RF signal processing device 112 may transmit the uplink data based on the transmission window corresponding to the current application scenario of the UE 110. In the embodiment, the processor 113 determines that no uplink packet from the foreground activity is generated in response to no uplink packet being generated from the foreground activity for a specific period.

In another embodiment, when the current application scenario of the UE 110 is that no foreground activity is running (but at least one background activity may still be running to generate uplink data), the RF signal processing device 112 may transmit the uplink data corresponding to the current application scenario of the UE 110 based on the transmission window corresponding to the current application scenario of the UE 110.

Figure 2:
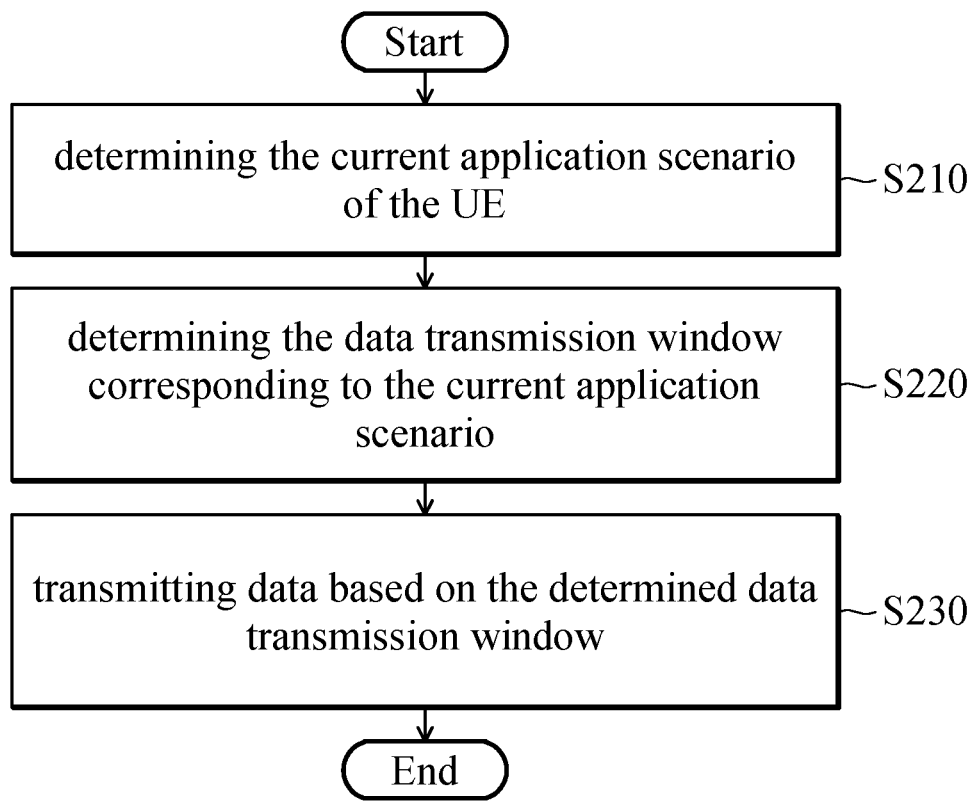
FIG. 2 is a flow chart illustrating a power optimization method for uplink data transmission according to an embodiment of the invention.

FIG. 2 is a flow chart illustrating a power optimization method for uplink data transmission according to an embodiment of the invention. The power optimization method can be applied to the UE 110. As shown in FIG. 2, in step S210, the UE 110 determines the current application scenario of the UE 110.

In step S220, the UE 110 may determine the data transmission window corresponding to the current application scenario, wherein data transmission windows corresponding to different application scenarios of the UE have at least one of different period to transmit data and different period to enter suspension. In some embodiments of the invention, the current application scenario of the UE is a foreground activity is running, no foreground activity is running, a Screen Off mode or a Do Not Disturb mode.

In step S230, the UE 110 may transmit data based on the determined data transmission window.

Figure 3:
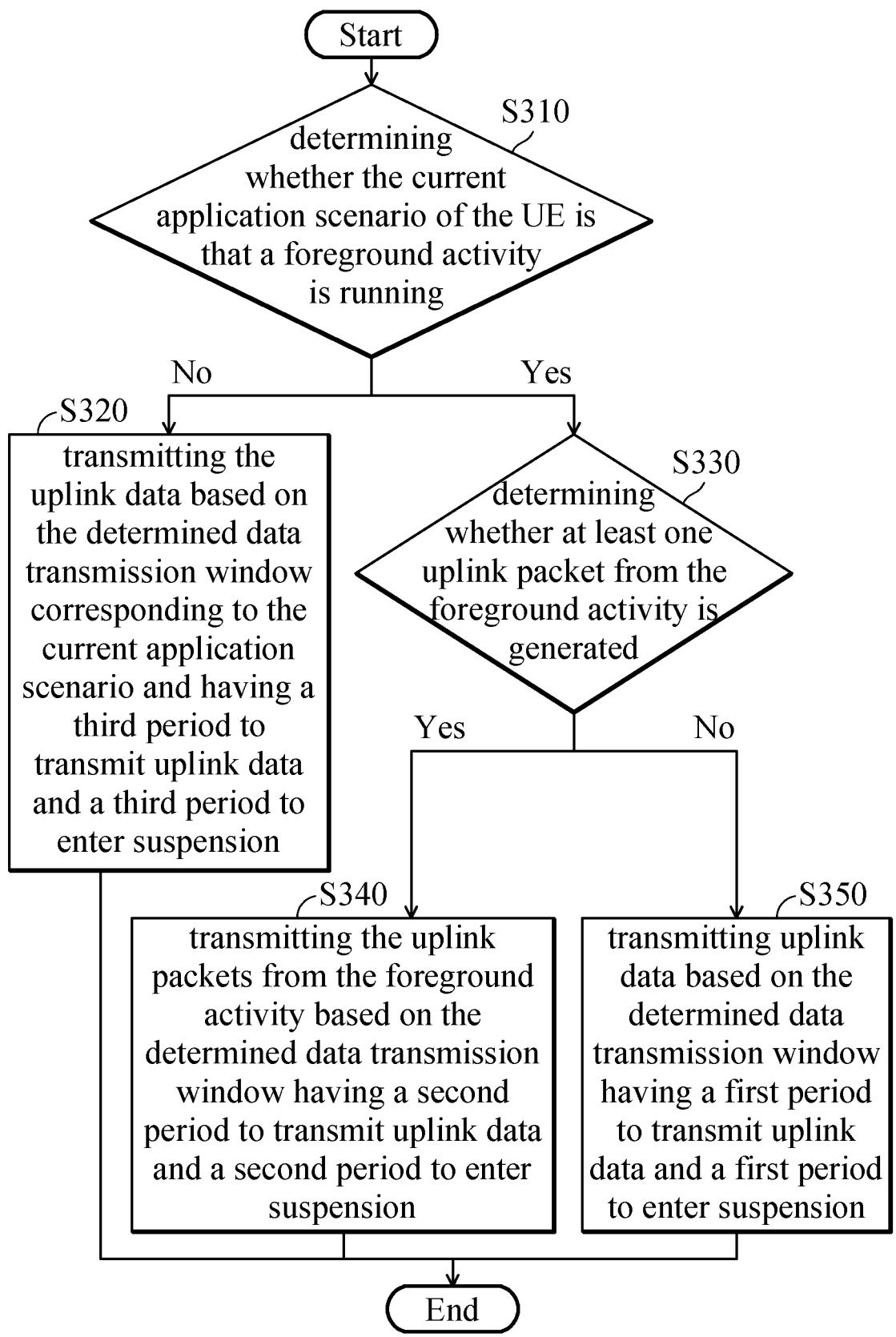
FIG. 3 is a flow chart illustrating a power optimization method for uplink data transmission according to another embodiment of the invention.

FIG. 3 is a flow chart illustrating a power optimization method for uplink data transmission according to another embodiment of the invention. The power optimization method can be applied to the UE 110. As shown in FIG. 3, in step S310, the UE 110 may determine whether the current application scenario of the UE 110 is that a foreground activity is running.

When the current application scenario of the UE 110 is that no foreground activity is running, step S320 is performed. In step S320, the UE 110 may transmit the uplink data based on the determined data transmission window corresponding to the current application scenario, wherein in step S320, the determined data transmission window may have a third period to transmit uplink data and a third period to enter suspension.

When the current application scenario of the UE 110 is that the foreground activity is running, step S330 is performed. In step S330, the UE 110 may determine whether at least one uplink packet from the foreground activity is generated.

When the current application scenario of the UE 110 is that the foreground activity is running and the at least one uplink packet from the foreground activity is generated, step S340 is performed. In step S340, the UE 110 may transmit the uplink packets from the foreground activity based on the determined data transmission window, wherein in step S340, the determined data transmission window may have a second period to transmit uplink data and a second period to enter suspension. In an embodiment, the second period to enter suspension may be equal or more than 0.

When the current application scenario of the UE 110 is that the foreground activity is running and no uplink packet from the foreground activity is generated, step S350 is performed. In step S350, the UE 110 may transmit uplink data based on the determined data transmission window, wherein in step S350, the determined data transmission window may have a first period to transmit uplink data and a first period to enter suspension. In step S350, the UE 110 may determine the current application scenario of the UE 110 is that the foreground activity is running and no uplink packet from the foreground activity is generated in response to no uplink packet being generated from the foreground activity for a specific period.

In the power optimization methods for uplink data transmission of the invention, the UE can perform different uplink traffic-shaping in different application scenarios. Therefore, the power consumption for the uplink data transmission will be reduced.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A power optimization method for uplink data transmission, applied in a user equipment (UE), comprising:
   determining, by the UE, a current application scenario of the UE, wherein the current application scenario of the UE is a foreground activity is running, no foreground activity is running, a Screen Off mode or a Do Not Disturb mode;
   determining, by the UE, a data transmission window corresponding to the current application scenario, wherein data transmission windows corresponding to different application scenarios of the UE have at least one of different period to transmit data and different period to enter suspension; and
   transmitting data based on the determined data transmission window,
   wherein when the current application scenario of the UE is the foreground activity is running and no uplink packet is generated from the foreground activity, the determined data transmission window has a first period to transmit data and a first period to enter suspension,
   wherein when the current application scenario of the UE is the foreground activity is running and at least one uplink packet is generated from the foreground activity, the determined data transmission window has a second period to transmit data and a second period to enter suspension, wherein the second period to enter suspension is equal or more than 0.

2. The power optimization method for uplink data transmission of claim 1, wherein the current application scenario is determined to the foreground activity is running and no uplink packet is generated from the foreground activity responsive to no uplink packet being generated from the foreground activity for a specific period.

3. The power optimization method for uplink data transmission of claim 1, wherein when the current application scenario of the UE is no foreground activity is running, the determined data transmission window has a third period to transmit data and a third period to enter suspension.

4. The power optimization method for uplink data transmission of claim 3, wherein at least one uplink packet is generated from a background activity.

5. A user equipment (UE) for power optimization for uplink data transmission, comprising:
   a radio frequency (RF) signal processing device, transmitting data to a network node;
   a memory device, storing a plurality of data transmission windows, wherein the plurality of data transmission windows correspond to different application scenarios of the UE and have at least one of different period to transmit data and different period to enter suspension; and
   a processor, coupled to the RF signal processing device and the memory device,
   wherein the processor determines a current application scenario of the UE and determines a data transmission window corresponding to the current application scenario, and the RF signal processing device transmits the data based on the data transmission window,
   wherein the current application scenario of the UE is a foreground activity is running, no foreground activity is running, a Screen Off mode or a Do Not Disturb mode,
   wherein when the current application scenario of the UE is the foreground activity is running and no uplink packet is generated from the foreground activity, the determined data transmission window has a first period to transmit data and a first period to enter suspension,
   wherein when the current application scenario of the UE is the foreground activity is running and at least one uplink packet is generated from the foreground activity, the determined data transmission window has a second period to transmit data and a second period to enter suspension, wherein the second period to enter suspension is equal or more than 0.

6. The UE of claim 5, wherein at least one uplink packet is generated from a background activity.

7. The UE of claim 5, wherein the current application scenario is determined to the foreground activity is running and no uplink packet is generated from the foreground activity responsive to no uplink packet being generated from the foreground activity for a specific period.

8. The UE of claim 5, wherein when the current application scenario of the UE is no foreground activity is running, the determined data transmission window has a third period to transmit data and a third period to enter suspension.

9. A computer-readable medium stores one or more instructions and operates with a user equipment (UE), and in response to the instructions having been executed by the UE, the UE executes a plurality steps, comprising:

- determining, by the UE, a current application scenario of the UE;
- determining, by the UE, a data transmission window corresponding to the current application scenario, wherein data transmission windows corresponding to different application scenarios of the UE have at least one of different period to transmit data and different period to enter suspension; and
- transmitting data based on the determined data transmission window,
- wherein the current application scenario of the UE is a foreground activity is running, no foreground activity is running, a Screen Off mode or a Do Not Disturb mode,
- wherein when the current application scenario of the UE is the foreground activity is running and no uplink packet is generated from the foreground activity, the determined data transmission window has a first period to transmit data and a first period to enter suspension,
- wherein when the current application scenario of the UE is the foreground activity is running and at least one uplink packet is generated from the foreground activity, the determined data transmission window has a second period to transmit data and a second period to enter suspension, wherein the second period to enter suspension is equal or more than.

10. The computer-readable medium of claim 9, wherein the current application scenario is determined to the foreground activity is running and no uplink packet is generated from the foreground activity responsive to no uplink packet being generated from the foreground activity for a specific period.

11. The computer-readable medium of claim 9, wherein when the current application scenario of the UE is no foreground activity is running, the determined data transmission window has a third period to transmit data and a third period to enter suspension.

* * * * *